3,135,611
METHODS FOR PRODUCING YEAST-LEAVENED BAKED GOODS
Kazuo Higashiuchi, Chicago, Ill., assignor to J. R. Short Milling Company, Chicago, Ill., a corporation of Illinois
No Drawing. Filed Aug. 31, 1962, Ser. No. 220,896
7 Claims. (Cl. 99—90)

This invention relates to methods for preparing baked goods and, more particularly, to improved methods for preparing yeast-leavened baked goods wherein novel additive materials are included in the dough to improve the same.

In the baking art, it has long been common practice to employ as additives in the dough mixture various agents intended to provide specific improvements in the finished product. Thus, calcium peroxide has long been employed to provide an increase in water absorption while maintaining satisfactory dough properties and avoiding deleterious volume changes in the finished product, and the bromates have been employed to provide a dough-maturing action evidenced by improvement in grain, texture and volume of the finished bread or other baked goods. Considering those agents which heretofore have proved suitable for commercial use, the action of each agent is more or less specific, and the baker has been forced to use more than one additive when a variety of improving actions is desired. In recent years, however, it has been discovered that certain acylic dihydroperoxides are effective, when added to the dough, both to provide increased water absorption and to accomplish a dough-maturing effect, these dual functions often being accompanied by an improvement in crumb color. Methods employing such dihydroperoxides are described and claimed, for example, in copending application Serial No. 15,782, filed June 23, 1959, on behalf of Herbert O. Renner, now Patent 3,084,048, issued April 2, 1963. While the peroxide compounds dealt with in the aforementioned copending application have marked advantages and constitute valuable tools in the hands of the baker, their use has involved certain inherent difficulties which it is desirable to overcome. Among these difficulties are the fact that the monomeric dihydroperoxides of ketones, for example, are not obtainable as solids under normal conditions, so that it is usually necessary to employ these compounds in special compositions which present manufacturing difficulties. Further, acyclic dihydroperoxides generally tend to be more or less unstable under conditions of manufacture and storage.

The present invention provides an improved method for preparing baked goods employing, as additives in the dough mixture, certain novel materials which have the same general advantageous capabilities as do the acyclic dihydroperoxides referred to above but which are available for use in stable solid form.

Stated broadly, the present invention is based upon the discovery that novel addition compounds of the general formula

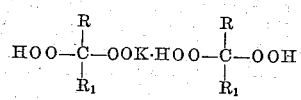

where R and $R_1$ are the same or different lower alkyl radicals each having 1–4 carbon atoms, are effective dough improving agents. Such compounds can be prepared with relative ease in pure, solid form and exhibit adequate stability for storage and use under the normal circumstances encountered in the trade. Described and claimed per se in my copending application Serial No. 220,895, filed concurrently herewith, such compounds include 2-hydroperoxy-2-potassiumperoxy propane·2,2-dihydroperoxy propane
2-hydroperoxy-2-potassiumperoxy butane·2,2-dihydroperoxy butane
2-hydroperoxy-2-potassiumperoxy-3-methyl butane·2,2-dihydroperoxy-3-methyl butane
2-hydroperoxy-2-potassiumperoxy-4-methyl pentane·2,2-dihydroperoxy-4-methyl pentane
3-hydroperoxy-3-potassiumperoxy pentane·3,3-dihydroperoxy pentane Addition compounds in accordance with Formula 1 can be prepared, as described in detail in the aforesaid copending application Serial No. 220,895, by reacting a potassium base with the appropriate monomeric dihydroperoxide in a liquid medium at or below room temperature. The addition compound precipitates promptly and is ordinarily recoverable in essentially pure form simply by separation of the precipitate from the mother liquor, followed by washing and drying of the recovered crystals. In pure form, the addition compounds described above are dangerous, being autoexplosive and highly flammable. However, when blended with a suitable extender, such as corn starch, for example, such compounds are entirely safe for storage, handling and use with ordinary accepted procedures.

Solid, particulate, edible extenders suitable for use in accordance with the invention include food starches, heat-modified food starches, dextrines, cereal flours, defatted cereal flours, heat-treated cereal flours, pre-oxidized starches and flours, wheat gluten, the vegetable proteins, including particularly soybean protein, and edible inorganic compounds such as the inorganic phosphates and calcium sulfate, which are inert to peroxides.

In general, the diluent or extender is employed in a quantity adequate to render the solid addition compound stable for the purposes of the present method. The amount of the extender must be at least such that the weight ratio of the addition compound to the extender is not more than 3:1. Of course, as high a proportion of the extender or diluent can be employed as is desirable under the particular circumstances of use. The upper limit on the extender is set only by the economics of the method and, under most circumstances, the weight ratio of addition compound to diluent will not be beyond 1:1000.

Though addition compounds in accordance with Formula 1 are flammable and explosive, their stability under normal conditions is such that they can be blended with the solid, particulate diluent or extender without unusual danger. For this purpose, most conventional blending devices can be employed and it is convenient to use the usual flour blender.

While it is advantageous to use the addition compounds of this invention in solid form when the invention is applied to the making of baked goods by conventional batch procedures, for example, the method can also be practiced by using an aqueous solution of the addition compound. Such solutions are stable and safe to handle. Further, the use of an aqueous solution of the addition compounds of Formula 1 introduce no extraneous materials to the dough, the water of the solution simply being subtracted from the water used in preparing the dough.

In accordance with the method, the peroxidic addition compound or compounds are employed in an amount which will provide in the dough a hydrogen peroxide equivalent content amounting to from 0.0005% to 0.012% of the weight of the flour in the dough. For conventional dough-making procedures, with average flours, best results are obtained when the peroxidic additive provides a hydrogen peroxide equivalent content equal to 0.001–0.002% of the flour weight.

In general, the addition compound is introduced into the dough prior to that mixing operation which is depended upon for dough development. Thus, when the straight-dough procedure is employed, the addition compound can be introduced any time prior to mixing. When the dough procedure is the usual sponge-dough method, the addition compound is added at the dough stage. When employing procedures which depend upon the use of the fluid brew or the like, such as the continuous-mix procedure, the addition compound is added directly to the preliminary dough mixture before that mixture is supplied to the dough developer. In the continuous-mix procedure, the peroxidic addition compound or compounds, suitably extended with a particulate solid material, can be incorporated in the flour stream which is fed to the preliminary mixer. Alternatively, the addition compound or compounds can be dissolved in the aqueous oxidant solution which is metered into the preliminary mixer.

Regardless of the particular bread-making procedure employed, it will be understood that one effect of the addition compound is to increase the water absorption of the dough. Hence, the water content of the dough must be increased commensurate with the amount of addition compound employed. Aside from this change, however, the manner of preparation of the dough in accordance with this invention remains unchanged.

The following examples are illustrative:

*Example 1*

Proceeding in accordance with my copending application Serial No. 220,895, the following addition compounds were prepared in essentially pure form:

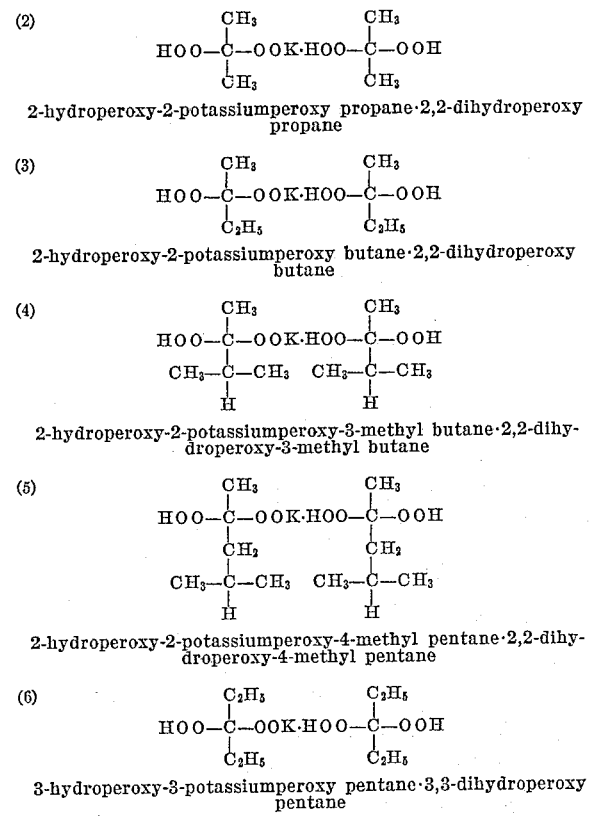

The dry, solid, essentially pure products were each blended with food grade corn starch to provide five free flowing compositions each with a hydrogen peroxide equivalent content of 0.34% by weight. Thus, composition A was prepared by blending 99.36 g. corn starch with 0.64 g. 2-hydroperoxy-2-potassiumperoxy propane·2,2-dihydroperoxy propane. Composition B was made by blending 99.24 g. corn starch and 0.71 g. 2-hydroperoxy-2-potassiumperoxy butane·2,2-dihydroperoxy butane. Composition C was prepared by blending 99.21 g. corn starch with 0.79 g. 2-hydroperoxy-2-potassiumperoxy-3-methyl butane·2,2-dihydroperoxy-3-methyl butane. Composition D was made by blending 99.21 g. corn starch and 0.79 g. 3-hydroperoxy-3-potassiumperoxy pentane·3,3dihydroperoxy pentane. Composition E was prepared by blending 99.13 g. corn starch with 0.87 g. 2-hydroperoxy-2-potassiumperoxy-4-methyl pentane·2,2-dihydroperoxy-4-methyl pentane. For comparison, a conventional calcium peroxide dough conditioner containing 0.72% by weight $CaO_2$ and having a hydrogen peroxide equivalent content of 0.34% by weight was used as composition F.

Seven separate doughs were prepared and baked concurrently, using the conventional sponge-dough method in accordance with the following formula:

| Sponge | Ingredient | Dough, g. |
|---|---|---|
| 450.0 g. | Flour | 250.0 |
| 300.0 cc. | Water | (see below) |
| 17.5 g. | Yeast | |
| 3.5 g. | Yeast food | |
| | Milk solids nonfat | 21.0 |
| | Salt | 14.0 |
| | Sugar | 35.0 |
| | Lard | 21.0 |

In one dough, hereafter called the control dough, no peroxidic additive was employed, and 130 cc. water was employed in the dough mixing stage. In each of doughs A–F, the additive compositions A–F, respectively, of this example were added with the flour in the dough mixing stage. 2.6 g. of each composition was employed, so that the additive in each dough provided a hydrogen peroxide equivalent content equal to approximately 0.0013% of the total flour weight. The water added in the dough mixing stage for each of doughs A–F amounted to 140 cc.

The usual calcium peroxide effect was noted in dough F, the dough being slightly bucky and dry despite the additional 10 cc. of water in the dough mixing stage. Essentially, the same effect was noted in each of doughs A–E, demonstrating that the peroxidic addition compounds employed in those doughs had the same dough conditioning effect as does calcium peroxide.

The bread from doughs A–E showed moderate improvement in crumb color, while the bread from dough F lacked this improvement. All of the bread from doughs A–E exhibited good grain and texture and the loaves were moderately better to markedly better than the bread from dough F in this regard.

*Example 2*

Employing the sponge-dough procedure, with the same formula as in Example 1, two doughs were prepared to compare the dough-improving effects of 2-hydroperoxy-2-potassiumperoxy propane·2,2-dihydroperoxy propane with the effects resulting from simple 2,2-dihydroperoxy propane. The dough-conditioning additive for dough G was composition A of Example 1. That for dough H was prepared by combining an aqueous solution of 2,2-dihydroperoxy propane with corn starch and drying the product. Both additives were employed in proportions providing, in the dough, a hydrogen peroxide equivalent content of 13 parts per million, based on the total flour weight. Both additives were used in the dough mixing stage and 140 cc. of water was added in that stage.

Doughs G and H were both bucky, but dough G was distinctly drier than dough H, the latter being slightly sticky. The loaf from dough G had a volume of 2750 cc., while the volume of that from dough H was 2675 cc. The two loaves were scored as follows:

|  | Dough G | Dough H |
|---|---|---|
| Grain (10) | 7.5 | 6.5 |
| Texture (15) | 11.5 | 11.5 |
| Crumb Color (10) | 6.5 | 6.0 |

It is thus apparent that, as an overall bread improver, the 2-hydroperoxy-2-potassiumperoxy propane·2,2-dihydroperoxy propane proved to be superior to 2,2-dihydroperoxy propane.

The foregoing examples illustrate the invention as practiced in connection with batch baking procedures of the sponge-dough type. To those skilled in the art, it will be obvious that the method can similarly be carried out when employing the straight dough batch procedure. The following example illustrates application of the invention to the continuous-mix method of baking.

*Example 3*

With continuous-mix equipment of the general type described in U.S. Patent 2,953,460, issued September 20, 1960, to John C. Baker, the following overall dough formula is employed:

| Lbs. | Oz. | Ingredient | Percent by Weight (Based on Flour) |
|---|---|---|---|
| 3,414 | | Flour | 100.00 |
| 2,253 | | Water (pH 7.1) | 66.00 |
| 153 | 10 | Corn sugar | 4.50 |
| 153 | 10 | Granulated sugar | 4.50 |
| 76 | 13 | Salt | 2.25 |
| 51 | 2 | Buttermilk powder | 1.00 |
| 51 | 2 | Milk powder | 1.00 |
| 6 | 13 | Yeast food | 0.20 |
| 5 | 2 | Calcium acid phosphate | 0.15 |
| 8 | 9 | Calcium propionate mold inhibitor | 0.25 |
| 93 | 3 | Lard | 2.75 |
| 3 | 7 | Mixed mono- and diglyceride bread softener | 0.10 |
| 9 | 4 | Stearin flakes | 0.27 |
| 85 | 6 | Yeast | 2.50 |
| 34 | | Enzyme composition consisting of 1 part by weight full fat enzymatically active soy flour and 3 parts by weight partially dextrinized corn flour. | 1.00 |
| 17 | | Refined cottonseed oil | 0.50 |

The oxidant solution is prepared by dissolving 180.0 g. 2-hydroperoxy-2-potassiumperoxy propane·2,2-dihydroperoxy propane in 60.0 lbs. of water, the total of the resulting solution being the correct amount for the 3414 lbs. of flour of the foregoing formula and being effective to introduce into the dough a hydrogen peroxide equivalent content amounting to approximately 60 p.p.m. based on the flour weight.

The brew is prepared by introducing all of the water, less that employed for the oxidant solution, into the brew mixing tank, along with all of the salt, milk, yeast food, mold inhibitor, bread softener and 82.5 lbs. of each of the two sugars. When agitation has been carried out to provide a uniform mixture, all of the enzyme composition is then added. Agitation is continued to disperse the enzyme composition throughout the brew mixture and the refined cottonseed oil is then poured in and dispersed by continued agitation. Agitation is then continued for 20 min. to effect substantial enzyme-peroxidation of the cottonseed oil.

The compressed yeast is then added and agitation is continued for 1¾ hrs., after which time the brew is transferred to a holding tank for delivery to the continuous preliminary mixer.

In preparing the dough, the brew is introduced continuously into the preliminary mixer, along with the remaining dough ingredients, feeding being carried out at rates to provide a dough composition of the formula indicated above. In addition, the oxidant solution is fed to the preliminary mixer continuously in the proportions hereinbefore indicated. The preliminary mixer is operated conventionally to form a uniform preliminary dough mixture which is pumped continuously through the dough developer. The fully developed dough is extruded directly from the developer into baking pans and is then baked continuously in conventional fashion. The final product is found to be improved, as to grain, texture and crumb color, in comparison with bread produced in the same fashion by employing an oxidant solution containing only potassium bromate and potassium iodate.

It will be understood by those skilled in the art that specific embodiments of the invention have been described for purposes of illustration, and various changes and modifications can be made therein without departing from the scope of the invention as defined in the appended claims.

I claim:

1. The method for preparing yeast-leavened baked goods comprising preparing a dough by combining with flour and other dough-forming ingredients at least one addition compound of the formula

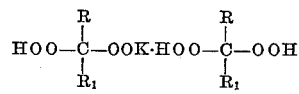

where R and $R_1$ are alkyl radicals having 1–4 carbon atoms, mixing the dough, and baking the dough so prepared, the amount of said addition compound employed being such as to introduce into the dough a hydrogen peroxide equivalent content equal to from about 0.0005% to about 0.012% of the flour weight.

2. The method for preparing yeast-leavened baked goods comprising preparing a dough by combining with flour and other dough-forming ingredients solid 2-hydroperoxy - 2 - potassiumperoxy propane·2,2-dihydroperoxy propane in an amount providing in the dough a hydrogen peroxide equivalent content of from about 0.0005% to about 0.012% of the weight of the flour employed, and baking the dough so prepared.

3. The method for preparing yeast-leavened baked goods comprising preparing a dough by combining with flour and other dough-forming ingredients solid 2-hydroperoxy-2-potassiumperoxy butane·2,2-dihydroperoxy butane in an amount providing in the dough a hydrogen peroxide equivalent content of from about 0.0005% to about 0.012% of the weight of the flour employed and baking the dough so prepared.

4. The method for preparing yeast-leavened baked goods comprising preparing a dough by combining with flour and other dough-forming ingredients solid 2-hydroperoxy-2-potassiumperoxy-3-methyl butane·2,2-dihydroperoxy-3-methyl butane in an amount providing in the dough a hydrogen peroxide equivalent content of from about 0.0005% to about 0.012% of the weight of the flour employed, and baking the dough so prepared.

5. The method for preparing yeast-leavened baked goods comprising preparing a dough by combining with flour and other dough-forming ingredients solid 2-hydroperoxy-2-potassiumperoxy-4-methyl pentane·2,2-dihydroperoxy-4-methyl pentane in an amount providing in the dough a hydrogen peroxide equivalent content of from about 0.0005% to about 0.012% of the weight of the flour employed, and baking the dough so prepared.

6. The method for preparing yeast-leavened baked goods comprising preparing a dough by combining with flour and other dough-forming ingredients solid 3-hydroperoxy - 3 - potassiumperoxy pentane·3,3-dihydroperoxy pentane in an amount providing in the dough a hydrogen peroxide equivalent content of from about 0.0005% to about 0.012% of the weight of the flour employed, and baking the dough so prepared.

7. The method for preparing yeast-leavened baked goods comprising preparing a dough by combining with flour and other dough-forming ingredients a solution of at least one addition compound of the formula

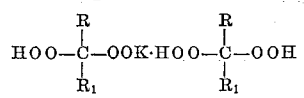

where R and $R_1$ are alkyl radicals having 1–4 carbon atoms, mixing the dough, and baking the dough so prepared, the amount of said addition compound employed being such as to introduce into the dough a hydrogen peroxide equivalent content of from about 0.0005% to about 0.012% of the flour weight.

References Cited in the file of this patent
UNITED STATES PATENTS
3,084,048   Renner _____ Apr. 2, 1963